(12) United States Patent
Attarwala et al.

(10) Patent No.: US 8,835,593 B2
(45) Date of Patent: Sep. 16, 2014

(54) ANAEROBICALLY CURABLE COMPOSITIONS

(75) Inventors: Shabbir Attarwala, Simsbury, CT (US); Ifeanyi C. Broderick, East Hampton, CT (US); Qinyan Zhu, Chesire, CT (US)

(73) Assignee: Henkel US IP LLC, Rocky Hill, CT (US)

( * ) Notice: Subject to any disclaimer, the term of this patent is extended or adjusted under 35 U.S.C. 154(b) by 844 days.

(21) Appl. No.: 12/562,603

(22) Filed: Sep. 18, 2009

(65) Prior Publication Data

US 2010/0006208 A1 Jan. 14, 2010

Related U.S. Application Data

(63) Continuation of application No. PCT/US2008/006343, filed on May 16, 2008.

(60) Provisional application No. 60/939,534, filed on May 22, 2007.

(51) Int. Cl.
| | | |
|---|---|---|
| C09J 177/12 | (2006.01) | |
| B32B 7/08 | (2006.01) | |
| F16B 1/00 | (2006.01) | |
| G01F 11/00 | (2006.01) | |
| C09J 4/06 | (2006.01) | |
| C08G 18/28 | (2006.01) | |
| C08G 18/10 | (2006.01) | |
| C09J 175/16 | (2006.01) | |
| C08G 18/67 | (2006.01) | |
| C08G 18/32 | (2006.01) | |
| C08G 18/36 | (2006.01) | |
| C08G 18/50 | (2006.01) | |
| C08L 23/06 | (2006.01) | |
| C08L 55/02 | (2006.01) | |

(52) U.S. Cl.
CPC .............. *C09J 4/06* (2013.01); *C08G 18/288* (2013.01); *C08G 18/10* (2013.01); *C09J 175/16* (2013.01); *C08G 18/672* (2013.01); *C08G 18/3206* (2013.01); *C08G 18/36* (2013.01); *C08L 23/06* (2013.01); *C08L 55/02* (2013.01); *C08G 18/5024* (2013.01)
USPC ............. 528/70; 528/50; 528/49; 525/455

(58) Field of Classification Search
USPC ........................... 528/75, 50, 49; 525/455
See application file for complete search history.

(56) References Cited

U.S. PATENT DOCUMENTS

| | | | |
|---|---|---|---|
| 4,111,890 A | | 9/1978 | Getson et al. |
| 4,320,221 A | | 3/1982 | Hoffman |
| 5,624,759 A | * | 4/1997 | Usifer et al. ............... 428/424.2 |
| 6,673,875 B2 | * | 1/2004 | Attarwala et al. ............ 525/450 |
| 6,723,763 B2 | * | 4/2004 | Zhu et al. ...................... 523/176 |
| 6,750,309 B1 | * | 6/2004 | Chu et al. ......................... 528/28 |
| 7,332,547 B2 | * | 2/2008 | Attarwala et al. ............ 525/426 |
| 7,537,839 B1 | * | 5/2009 | Attarwala et al. ............ 428/463 |
| 2005/0239952 A1 | * | 10/2005 | Attarwala et al. ............ 524/556 |
| 2010/0061823 A1 | * | 3/2010 | Attarwala et al. ............ 411/378 |

FOREIGN PATENT DOCUMENTS

| | | |
|---|---|---|
| JP | 61-040388 | 2/1986 |
| JP | 08-120247 | 5/1996 |
| JP | 11-302347 | 11/1999 |
| JP | 2003-013027 | 7/2003 |

* cited by examiner

*Primary Examiner* — Mike M Dollinger
(74) *Attorney, Agent, or Firm* — Steven C. Bauman

(57) ABSTRACT

Dry-to-the-touch compositions containing a curable polymeric matrix and a curable anaerobic composition present within the polymeric matrix are disclosed. In a particularly desirable form, the compositions are moisture curable. The compositions are non-flowable at high temperatures and have an improved solvent resistance once cured.

14 Claims, No Drawings

ANAEROBICALLY CURABLE COMPOSITIONS

RELATED U.S. APPLICATION DATA

This application continues from International Patent Application No. PCT/US2008/006343, filed May 16, 2008, which claims the benefit of an earlier filing date from U.S. Provisional Application No. 60/939,534, filed May 22, 2007 the disclosures of each of which hereby being expressly incorporated herein by reference.

BACKGROUND OF THE INVENTION

1. Field of the Invention

The present invention relates to curable adhesive and sealant compositions in a dry-to-the-touch form. More particularly, the present invention relates to dry-to-the-touch adhesive and sealant compositions which are particularly useful in threadlocking and sealing applications and may include various product forms of the compositions including dry-to-the-touch tapes and gaskets.

2. Brief Description of Related Technology

It is common practice in the use of threaded mechanical fasteners, such as nut/bolt assemblies, to apply to one or more of the threadable engagement surfaces thereof an adhesive/sealant composition, termed a threadlocking composition, for the purpose of locking and/or sealing the constituent members of such fasteners when they are engaged in their final interlocked state.

Such threadlocking compositions significantly increased the torque required to break or turn the engaged threaded members. Conventional threadlocking compositions oftentimes include co-reactive adhesive systems. With this type of threadlocking composition, two or more components are mixed before applying the resulting composition to the threaded engagement surface(s) of the fastener on which the components in the threadlocking composition react to cure. Examples of such co-reactive systems include epoxy resin adhesive compositions.

Liquid adhesive compositions have long been used in sealing and threadlocking applications and have become a standard part of assembly production as well as in the maintenance of machinery, tools and the like. Among the liquid adhesive compositions commonly used in these applications are anaerobic compositions. These compositions provide excellent threadlocking and sealing properties when cured and that remain stable, and thus in liquid form, until they are placed between parts where they cure in the absence of air. Moreover, these compositions remain stable for long periods of time during storage in the bottle.

In many situations, the ability of the liquid adhesive composition to migrate from parts is problematic, causing contamination in the general vicinity, as well as contamination of the environment. One attempt to create a convenient ready-to-use threadlocking product has been the use of preapplied adhesive compositions, such as those in micro-encapsulated form. In such cases, the adhesive composition is applied to the threaded part, such as a bolt or nut, and remains in the uncured state until mated. Generally, in this case, components which would cause premature curing of the unmated part are kept separated from other components by encapsulation. The mating of the parts causes rupture of the encapsulation casing, thereby releasing the components for cure.

Compositions that are applied to parts just before mating have also relied on wax or wax-like matrices into which anaerobic curable resins are incorporated. While such compositions are easy to apply and have certain advantages, such as non-flowability due to their rheological properties, they are not dry-to-the-touch. Moreover, such compositions generally lose their non-flowable nature once certain temperatures are exceeded, such as 180° F. or in some cases involving polyamide matrices those temperatures may reach 260° C. (500° F.) before that happens, and thus lose their advantage over pre-applied or traditional liquid thread lockers since at these temperatures migration begins to occur. Moreover, the wax or wax-like matrices have been described as being used in significantly smaller amounts than the anaerobic component such as amounts of up to about 20% by weight of the total compositions.

While preapplied coatings have many advantages, special processing is sometimes required to prepare and apply the adhesive coatings in advance. Such compositions are not always useful on an as-needed basis, such as when an immediate need for application of a curable composition is required. For instance, it may be necessary to stock and inventory different sizes of pre-applied coated parts in advance. Thus, pre-applied coatings do not solve the problem for many applications requiring ready-to-use compositions.

Though conventional anaerobic threadlockers have been and remain well-received in the marketplace, there are shortcomings for certain commercial applications that have been observed with the use of conventional liquid anaerobic threadlockers, as well as known non-flowable, thixotropic anaerobic-based threadlockers. For instance, oftentimes such compositions do not fully cure through large gaps. Also, because of their nature of anaerobic cure, portions of the adhesive which remain exposed to air once applied to the parts will have difficulty curing (absent a secondary cure mechanism that is triggered). Thus, external bondlines which remain exposed to air on a nut/bolt assembly oftentimes will remain liquid unless additional additives and cure measures are taken to ensure cure. As a result, liquid compositions at the external bondlines tend to migrate. In the case of conventional non-flowable compositions, which depend on the thixotropic and/or rheological properties of the composition for their non-flowability, these compositions will flow if the temperature to which they are exposed is high enough. Additionally, the resistance to solvents of cured products (that have portions which remain uncured, as noted above) may be poor, indicative of questionable integrity when environmental interaction occurs. This may lead to contamination problems and hazardous conditions for the surroundings.

It would be extremely useful and a significant advance in the field of reactive threadlockers and sealants, to provide a reactive formulation useful for threadlocking applications, which overcomes the disadvantages of known compositions. It would also be highly advantageous to provide a cost effective dry-to-the-touch, easy to apply composition, as an alternative to such known threadlocking compositions.

SUMMARY OF THE INVENTION

The present invention relates to a composition useful for adhesively fixturing matably engageable structural elements, such as threadlocking or nut/bolt assemblies, so that the structural elements are adhesively bonded and sealed upon their being engaged in a final interlocked state. The present invention broadly relates to a co-reactive adhesive/sealant composition, having utility for threadlocking matably engageable surfaces of threaded mechanical fasteners, or adhesive bonding of other matably engageable structural elements.

The present invention relates to dry-to-the-touch compositions which include a polymeric matrix and an anaerobically curable component dispersed within the polymeric matrix, where the polymeric matrix should be present in amounts of about 30% to about 80% by weight of the composition and the composition itself remains non-flowable at temperatures greater than 260° C. up to about 300° C. The polymeric matrix may include materials selected from polyurethanes, polyureas, polysulfonamides, polythiourethanes and combinations thereof.

In some aspects of the invention, a polyurethaneurea may be used in combination with one or more of the polymeric matrices mentioned above. In other aspects of the invention, a polyurethaneurea polymeric matrix may be used as the sole or primary polymer in the matrix. Here, the polyurethaneurea may be present in an amount of about 30% to about 80% by weight of the total composition. Compositions employing a polyurethaneurea in the polymeric matrix, either alone or in combination with other polymers in the matrix, also remain non-flowable at temperatures greater than 260° C. up to about 300° C.

The inventive compositions are dry-to-the-touch and may include more than one cure mechanism, e.g. a dual cure system. The polymer matrix may serve as a carrier for the anaerobically curable composition or there may be a separate carrier on which the inventive compositions are formed and reside prior to end use. For example, in some instances a film substrate may be used as a separate carrier for the inventive compositions which may be deposited in tape form on the film substrate.

In some aspects of the invention, the curable polymeric matrix may undergo a secondary cure stage. For example, the presence of residual or latent reactive groups on the cured polymeric matrix permits further cure, and in some instances, reaction with the anaerobic component.

The anaerobically curable composition includes a (meth) acrylate, and a free radical initiator, such as a peroxide or a perester. The anaerobically curable component serves to provide sealant and threadlocking properties for the composition. In the context of the present invention, the anaerobically curable composition is distributed within the polymeric matrix. The resulting composition may then be applied to an inert carrier substrate, such as a film or strip, and after exposure to conditions sufficient to cure, the polymeric matrix portion of the composition cures to a dry-to-the-touch film or coating. The anaerobically curable compositions within the polymeric matrix are then cured once conditions conducive to anaerobic cure are attained.

The compositions of the present invention are less messy, do not drip, may be applied to parts and stored prior to use have large gap-filling capabilities, and may be easily transported in a portable form, such as a toolbox, in large part due to their dry-to-the-touch nature, even prior to anaerobic cure.

The present invention may also be used to create articles of manufacture, such as tapes, films, strips, gaskets, pads, strings, and various other shaped pieces, which may be applied to a threaded part, such as a nut or a bolt, or other substrates, the anaerobic portion remaining uncured until subjected to conditions suitable for anaerobic cure, such as the exclusion of air by the mating of parts. The compositions may also be useful in various sealing and potting applications.

As noted above, another advantage of the inventive compositions includes the ability to be used in large gap applications, at which known anaerobically curable compositions are not well-equipped to succeed. Conventional anaerobically curable compositions are stabilized in the presence of oxygen or air, and as such do not effectively cure at the edge of the mating parts, because that location is oftentimes exposed to air. This results in the potential for uncured material to remain even after the mating parts are adhesively secured. The uncured composition is free to migrate, contaminate its surroundings and can create difficulties in product quality and increase manufacturing costs. Heretofore, this disadvantage had been remedied through the use of a secondary cure system, such as light cure, to seal that exposed portion. However, these disadvantages are overcome by the inventive compositions because the products formed therefrom, e.g., threaded parts having the inventive composition applied thereon, are all dry-to-the-touch and do not melt or soften unless subjected to high temperature. The cured polymeric matrix may serve to prevent the anaerobic component from migrating by effectively trapping it within the matrix.

In some aspects of the invention, there is provided a composition including a first part including: a curable composition including: a diisocyanate and optionally at least one material selected from a polyol, a polyamine, and a polythiol; and a second part including: a curable composition including: an anaerobically curable material including a (meth)acrylate component; an anaerobic cure system; and at least one material selected from a polyol, a polyamine, and a polythiol. The anaerobic cure system may include a peroxide. Desirably, the composition is non-flowable prior to anaerobic cure at temperatures of greater than 260° C. up to about 300° C. In some aspects, the diisocyanate may be a polymeric diisocyanate. Desirably, the first part may be present in amounts of about 30% to about 80% by weight percent of the total composition.

In some aspects of the invention, there is provided a composition including a first part including the cured reaction product of a diisocyanate and one or more of; a polyol; a polyamine and a polythiol; and a second part including an anaerobically curable component, where the first part includes about 30% to about 80% by weight of the total composition and the composition is non-flowable at temperatures greater than 260° C. up to about 300° C.

In some aspects of the invention, there is provided a composition including a first part including a diisocyanate; and a second part including an anaerobically curable component; and at least one of the following: a polyol; a polyamine; and a polythiol; where the composition is non-flowable at temperatures greater than 260° C. up to about 300° C.

In other aspects of the invention, there is provided an article of manufacture including a threaded member, the threads of which are at least partially coated with a first part including: a curable composition including: a diisocyanate and optionally at least one material selected from a polyol, a polyamine, and a polythiol; and a second part including: a curable composition including: an anaerobically curable material including a (meth)acrylate component; an anaerobic cure system; and at least one material selected from a polyol, polyamine, and a polythiol.

In other aspects of the invention, there is provided an article of manufacture including a preformed gasket including a composition including a first part including: a curable composition including: a diisocyanate and optionally at least one material selected from a polyol, a polyamine, and a polythiol; and a second part including: a curable composition including: an anaerobically curable material including a (meth)acrylate component; an anaerobic cure system; and at least one material selected from a polyol, a polyamine, and a polythiol.

In other aspects of the invention, there is provided an article of manufacture including a dispenser including a composition including a first part including: a curable composition including: a diisocyanate and optionally at least one material selected from a polyol, a polyamine, and a polythiol; and a second part including: a curable composition including: an anaerobically curable material including a (meth)acrylate component; an anaerobic cure system; and at least one material selected from a polyol, a polyamine, and a polythiol. In some aspects, the dispenser may include separate chambers for the first part and the second part and one or more plungers to advance the contents of the separate chambers. In other aspects, the dispenser may include a static mixing nozzle for mixing the first and second parts.

In some aspects of the invention, there is provided a method of sealing threaded parts including: providing a first threaded member; providing a second threaded member capable of matingly engaging with the first threaded member; at least one of the first and second members being at least partially coated with a composition including: a first part including a curable composition including: a diisocyanate and optionally a polyol, a polyamine or a polythiol; and a second part including a curable composition including: an anaerobically curable material including a (meth)acrylate component; an anaerobic cure system; and at least one material selected from a polyol, a polyamine or a polythiol; and matingly engaging the first and second threaded members and permitting the composition to anaerobically cure therebetween.

In other aspects of the invention there is provided, a composition including: a first part including: curable composition including: a diisocyanate and optionally a polyol or a polyamine; and a second part including: a curable composition including: an anaerobically curable material including a (meth)acrylate component; an anaerobic cure system; and a polyol or a polyamine.

DETAILED DESCRIPTION OF THE INVENTION

The present invention broadly relates to a reactive adhesive/sealant composition, having utility for threadlocking matable engagement surfaces of threaded mechanical fasteners, or adhesive bonding of other matably engageable structural elements. Compositions of the present invention, in general, include a polymeric matrix and an anaerobically curable component within the polymeric matrix.

The term "curing", or "cure" as used herein, refers to a change in state, condition, and/or structure in a material, as well as, partial and complete curing.

As used herein, the term "(meth)acrylate" is intended to include methacrylates and acrylates.

The term "partially cured" indicates that some portion of the reactive groups remain unreacted. The term "substantially cured" indicates a negligible amount, if any, of the reactive groups remain unreacted. The unreacted groups may further participate in reacting with the anaerobic composition or other components present in a subsequent polymerization.

The term "dry-to-the-touch" indicates that the composition has sufficiently solidified or cured such that when a cotton swab is gently touched to the surface of the polymeric matrix, no adherence of the swab occurs. The term "dry-to-the-touch time" indicates the time necessary to achieve a dry-to-the-touch state.

The term "tack-free" indicates the surface of the composition does not stick to a high-density polyethylene disposable pipette when the pipette gently touches the surface of the material. The term "tack-free time" indicates the time necessary to reach a tack-free state.

Polymeric Matrix

The polymeric matrix may include a polymer selected from polyurethanes, polyureas, polysulfonamides, polythiourethanes or any combinations thereof. The polymeric matrix may also include polyurethaneureas alone or in combination with other polymers. The polymer may be dried or cured to trap therein the anaerobically curable component which has been distributed therethrough. This results in a dry-to-the-touch composition that still has the ability to anaerobically cure when subjected to conditions conducive to anaerobic cure. As previously mentioned, the polymeric matrices allow for large gap filling, such as 50 mm to 500 mm or greater, due to the ability of the cured matrix to retain the unreacted liquid anaerobic resin and anaerobic cure system without loss to the surrounding environment of unreacted components. Thus, even very large gap applications remain dry-to-the-touch. Moreover, parts such as stand-alone gaskets may be made from the compositions, which can then be placed between parts and allowed to further cure anaerobically. Once the polymeric matrix of the inventive compositions is cured, a non-flowable state for the composition is reached. In some embodiments, depending on the choice of polymer matrix, the matrix remains dry-to-the-touch up to temperatures of 400° C. (752° F.). Generally, the compositions remain dry-to-the-touch and non-flowable at temperatures greater than 260° C. (500° F.) and desirably greater than 300° C. (572° F.).

The polymeric matrix itself has a melting or softening point greater than 260° C. Desirably the polymeric matrix has a melting or softening point greater than 300° C. In some embodiments the melting point or softening point is between about 300° C. and about 400° C. Thus, the inventive compositions are non-flowable at temperatures considerably higher than known anaerobic threadlockers having the anaerobic curable component in a carrier or matrix.

The polymeric matrix, which is responsible for the dry-to-the-touch property of the inventive compositions, is desirably present in amounts of about at least 30% by weight, and desirably about at least 50% by weight of the total composition and may be present in amounts of about 80% by weight.

Examples of useful polyurethanes include those compounds having a repeating unit such as,

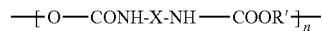

where X is an aliphatic or aromatic hydrocarbyl or heterohydrocarbyl diradical group or chain and n is 1-4. $R^1$ is an alkylenyl or an arylenyl group.

Other useful polyisocyanates include polymeric polyisocyates such as those conforming to the general structure:

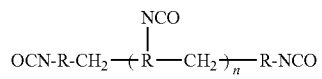

where R in each occurrence may be the same or different and may be a hydrocarbyl group or hetero hydrocarbyl diradical and n is 1-20.

The polyurethanes useful as the polymeric matrix may be formed from the reaction product of an isocyanate and an alcohol. Examples of useful polyisocyanates include those that correspond to the following formula:

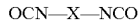

where X in each occurrence may be the same or different and is a $C_{1-20}$ hydrocarbon or heterohydrocarbon diradical. Desirably, X is an alkylene or an arylene diradical.

For example, useful isocyanates for forming the reaction product(s) include polyisocyanates such as monomeric 4,4'-methylene diphenyl diisocyanate ("MDI"), phenyl diisocyanate, toluene diisocyanate ("TDI"), 4,4'-diphenyl diisocyanate, 4,4'-diphenylene methane diisocyanate, dianisidine diisocyanate, 1,5-naphthalene diisocyanate, 4,4'-diphenyl ether diisocyanate, p-phenylene diisocyanate, 4,4'-dicyclohexylmethane diisocyanate, 1,3-bis-(isocyanatomethyl)cyclohexane, cyclohexylene diisocyanate, tetrachlorophenylene diisocyanate, 2,6-diethyl-p-phenylenediisocyanate, and 3,5-diethyl-4,4'-diisocyanatodiphenylmethane. Still other polyisocyanates that may be used are polyisocyanates obtained by reacting polyamines containing terminal, primary and secondary amine groups or polyhydric alcohols, for example, the alkane, cycloalkane, alkene and cycloalkane polyols such as glycerol, ethylene glycol, bisphenol-A, 4,4'-dihydroxy-phenyldimethylmethane-substituted bisphenol-A, and the like, with an excess of any of the above-described isocyanates.

Useful alcohols for reacting with the polyisocyanate to form the polyurethanes include, without limitation, polyethyl glycol ethers having 3-7 ethylene oxide repeating units and one end terminated with an ether or an ester, polyether alcohols, polyester alcohols, as well as alcohols based on polybutadiene. One particularly useful alcohol is 1,4-butanediol. Additional useful alcohols include, without limitation, castor oil, glycerin, polyethylene glycol, etherdiol, ethylene glycol, caprolactone polyols and combinations thereof.

The specific type of alcohol chosen and the molecular weight range can be varied to achieve the desired effect. Generally, polyhydroxy compounds, straight or branched chain aliphatic or cyclic primary or secondary alcohols containing $C_{5-25}$ may be used.

Examples of useful polyureas in the present invention include, without limitation, those compounds including the repeating unit

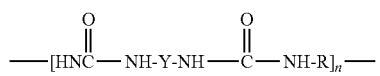

where Y and R are hydrocarbon or heterohydrocarbon diradicals and n is 1-20.

The polyureas useful as the polymeric matrix may be formed from the reaction product of an isocyanate and an amine. Examples of useful polyisocyanates may include any of those as listed above.

Useful amines include aliphatic or aromatic amines. Desirably polyamines are particularly useful. Desirable aliphatic amines include polyethylene glycol ether amines. Desirable aromatic amines include those having polyethylene glycol ether substitution on the aromatic ring.

For example, commercially available amines sold under the tradename JEFFAMINE by Huntsman Corporation, Houston, Tex., may be employed. Examples include JEFFAMINE D-230, JEFFAMINE D-400, JEFFAMINE D-2000, JEFFAMINE T-403, JEFFAMINE ED-600, JEFFAMINE ED-900, JEFFAMINE ED-2001, JEFFAMINE EDR-148, JEFFAMINE XTJ-509, JEFFAMINE T-3000, JEFFAMINE T-5000, and combinations thereof. The JEFFAMINE D series are diamine based products and may be represented by:

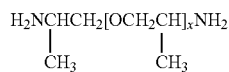

(Cas Registry No. 904610-0)
where x is about 2.6 (for JEFFAMINE D-230), 5.6 (for JEFFAMINE D-400) and 33.1 (for JEFFAMINE D-2000), respectively.

The JEFFAMINE T series are trifunctional amine products based on propylene oxide and may be represented by:

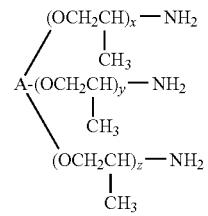

where x, y and z are set forth below in Table A.

TABLE A

| JEFFAMINE | | Approx. | Mole |
|---|---|---|---|
| Product | Initiator (A) | Mol. Wt. | PO |
| T-403 | Trimethylolpropane | 440 | 5-6 |
| T-3000 | Glycerine | 3,000 | 50 |
| T-5000 | Glycerine | 5,000 | 85 |

More specifically, the JEFFAMINE T-403 product is a trifunctional amine and may be represented by:

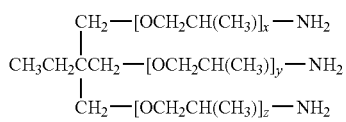

where x+y+z is 5.3.
(CAS Registry No. 39423-51-3)
The JEFFAMINE ED series are polyether diamine-based products and may be represented by:

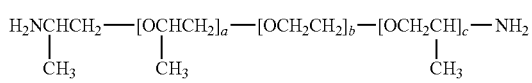

where a, b and c are set forth below in Table B.

TABLE B

| JEFFAMINE | Approx. Value | | Approx. |
|---|---|---|---|
| Product | B | a + c | Mol. Wt. |
| ED-600 | 8.5 | 2.5 | 600 |
| ED-900 | 15.5 | 2.5 | 900 |
| ED-2001 | 40.5 | 2.5 | 2,000 |

As used herein, the terms "polyurethaneurea" and "polyureaurethane" are interchangeable. Examples of useful polyurethaneureas include the reaction products of the reaction of diols and diamines with diisocyantes. These reactants may be selected from a wide variety of materials including those described previously for their respective classes.

Examples of useful polysulfonamides include those formed from the reaction product of isocyanates with compounds having the general structure of

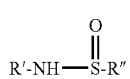

where R' and R" are hydrocarbyl or heterohydrocarbyl groups. An example of a sulfonamide is the composition formed by the reaction of saccharin with isocyanate.

The polythiourethanes useful as the polymeric matrix may be formed from the reaction product of a polyisocyanate and a polythiol. Examples of useful polyisocyanates may include any of those listed herein. Examples of useful polythiols include those which have an available —SH group. For example, useful polythiols for forming the reactant product include pentaerythritol tetrakis [3-mercaptoproprionate], among others.

The polymeric matrices allow the compositions to be used on a variety of surfaces including ferrous-containing surfaces, non-ferrous metals such as stainless steel, zinc phosphorous coated surfaces, other passive metal surfaces, wood and plastics. Whereas conventional anaerobically-curing threadlockers generally require the presence of a ferrous-containing surface for cure, the inventive compositions are surface insensitive due to the polymeric matrix, which will cure on virtually any surface and in the presence of air.

Anaerobic Compositions

The anaerobically curable composition which is distributed within the polymeric matrix may be chosen from any number of anaerobic compositions. Compositions useful include an anaerobically curable component such as a (meth) acrylate monomer or oligomer and a free radical initiator, such as a peroxide.

Examples of useful (meth)acrylates include, monomers such as, monomethacrylates, dimethacrylates, trimethacrylates and tetramethacrylates. (Meth)acrylate monomers suitable for use herein include hydroxypropyl (meth)acrylate ("HPMA"), hydroxyethyl (meth)acrylate ("HEMA"), cyclohexyl (meth)acrylate, tetrahydrofuran (meth)acrylates, glycidyl (meth)acrylates, cyanoethyl (meth)acrylate, hexanediol di(meth)acrylate, polyethylene glycol di(meth)acrylates, diethylene glycol di(meth)acrylate, triethylene glycol di(meth)acrylate ("TRIEGMA"), tetraethylene glycol di(meth)acrylate, dipropylene glycol di(meth)acrylate, di-(pentamethylene glycol) di(meth)acrylate, tetraethylene diglycol di(meth)acrylate, neopentyl glycol diacrylate, tetramethylene di(meth)acrylate, ethylene dimethacrylate, bisphenol-A di(meth)acrylates, such as ethoxylated bisphenol-A (meth)acrylate ("EPIBMA"), trimethylol propane tri (meth)acrylate, timethylol propane triacrylate and diglycerol tetra(meth)acrylate.

Of course, combinations of these (meth)acrylate monomers may also be used.

In one embodiment, the (meth)acrylate has the general structural formula II.

$$H_2C=CGCO_2R^2 \quad (II)$$

where G may be hydrogen, halogen or alkyl of 1 to about 4 carbon atoms, and $R^2$ may be selected from alkyl, cycloalkyl, alkenyl, cycloalkenyl, alkenyl, aralkyl or aryl groups 6 to about 16 carbon atoms, any of which may be optionally substituted or interrupted as the case may be with oxygen, halogen, carbonyl, hydroxyl, ester, carboxylic acid, urea, urethane, carbonate amine, amide, sulfur, sulfone and the like.

In another, particularly desired embodiment, the (meth) acrylates have general structural formula III:

(III)

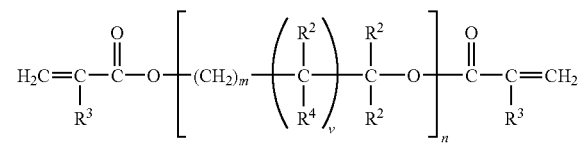

where $R^2$ may be selected from hydrogen, alkyl of 1 to about 4 carbon atoms, hydroxyalkyl of 1 to about 4 carbon atoms or

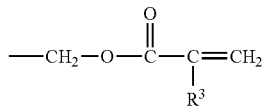

$R^3$ may be selected from hydrogen, halogen, and alkyl of 1 to about 4 carbon atoms;

$R^4$ may be selected from hydrogen, hydroxy and

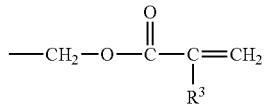

m is an integer equal to at least 1, e.g., from 1 to about 8 or higher, for instance, from 1 to about 4;

n is an integer equal to at least 1, e.g., 1 to about 20 or more; and v is 0 or 1.

The (meth)acrylate should be present in the compositions within the range of from about 1 percent by weight to about 60 percent by weight, desirably from about 5 percent by weight to about 50 percent by weight, such as from about 10 percent by weight to about 40 percent by weight, based on the total composition.

Examples of useful peroxides which may be incorporated in the present invention, include without limitation, hydroperoxides such as cumene hydroperoxide ("CHP"), t-butylhydroperoxide ("TBH"), p-menthane hydroperoxide, diisopropylbenzene hydroperoxide, pinene hydroperoxide, methyl ethyl ketone hydroperoxide, and tertiary butyl perbenzoate.

In one desirable aspect of the invention, the polymeric matrix may cure by moisture and thus, a moisture cure catalyst may be included to speed and/or enhance the cure. Examples of useful moisture cure catalysts include organometal catalysts including titanates such as tetraisopropylorthotitanate and tetrabutoxyorthotitanate, as well as metal carboxylates such as dibutyltin dilaurate, dibutyltin dioctoate and the like. Useful moisture cure catalysts include metal salts typically selected from titanium, tin, zirconium and combinations thereof. Nonlimited examples of moisture cure catalysts include, for example, dibutyltin dilaurate, dibutyltin diacetate, dibutyltin dioctoate, dibutyltin maleate, dialkyl fin hexoate, dioctyltin dilaurate, iron octanoate, zinc octanoate, lead octanoate, cobalt naphthenate, tetrapropyltitanate and tetrabutyltitanate. Other useful moisture cure catalysts, such as those disclosed in U.S. Pat. No. 4,111,890, may also be employed and are herein incorporated by reference.

Other conventional catalysts can also be incorporated into the present invention. For example, the inventive compositions also include an addition cure catalyst. Suitable addition cure catalysts that can be used with the present compositions include platinum-based ones, such as platinum-siloxane complexes, which facilitate hydrosilation reactions. The moisture cure catalyst should be used in an amount sufficient to effectuate moisture cure, which desirably is in the range of about 0.1 to about 10% by weight. Elevated temperatures may also be used to cure the inventive compositions of the present invention. Photoinitiators, such as visible and UV initiators, may also be incorporated.

Another embodiment of the invention may include a cured polymeric matrix and an uncured anaerobically curable composition. The cured polymeric matrix may include a material selected from polyurethanes, polyureas, polysulfonamides and combinations thereof, examples of which are discussed above. The cured polymeric matrix may also be made from or include polyurethaneureas. The cured polymeric matrix may include a reaction product of a polyisocyanate with at least one of the following: a polyalcohol, a polyamine or a polythiol, examples of which are discussed herein. The cured polymeric matrix may be a moisture curable composition, examples of which are discussed above. The uncured anaerobically curable composition which is distributed within the polymeric matrix may be chosen from any number of anaerobic compositions. For example, the uncured anaerobically curable composition may include a (meth)acrylate and a peroxide, examples of which are discussed herein.

Pre-formed articles made from the compositions of the present invention may include tapes having a substrate carrier, such as a film, and a coating which includes the compositions of the invention. Useful tape substrate carriers include plastic, cellulosic, cotton or polyurethane films. The tape substrate may be in the form of a tape, a string, a sheet or film. Useful polymeric matrixes and anaerobically curable components are described above. Pre-coated articles include matably engageable substrates, such as threaded parts. The inventive compositions may be applied to these parts and cured, desirably by moisture, to a dry-to-the-touch coating or film which is further capable of anaerobic cure once assembled with a matable part. Alternatively, a pre-formed dry-to-the-touch film may be formed and then applied to a substrate. The coated substrate may then undergo anaerobic cure when exposed to appropriate anaerobic conditions. Other pre-formed articles may be formed which can undergo further anaerobic curing. For example, gaskets may be formed from the inventive compositions which can then be placed between mating surfaces and anaerobically cured.

EXAMPLES

Example I

A one part anaerobic adhesive, sold by Henkel Corporation as Threadlocker 2760 was used to make a two-part adhesive composition. These parts are described in Table I. Both parts were then mixed together to form the final composition. The final composition was then used to coat a substrate, such as cellophane tape, Teflon tape, and cotton string and allowed to room temperature moisture cure for 24 hours to produce a dry-to-the-touch composition. The final composition was also applied as a thin film coating to a polyethylene substrate and similarly cured. The cured films were then peeled from their respective substrates and applied to the threads of the bolts. The bolts were then matched with the nuts, the assembly was pretorqued to 40 in/lb and then allowed to room temperature anaerobic cure for 24 hours.

TABLE I

| Inventive Composition A | |
|---|---|
| COMPONENT | % WT |
| PART ONE | |
| EBIPMA | 72.00 |
| PEGMA | 22.50 |
| Saccharin | 1.000 |
| Stabilizers | 0.500 |
| Dyes | 0.500 |
| Accelerator (acetyl phenylhydrazine (APH)) | 0.500 |
| Thickener (silica) | 2.000 |
| CHP (cumene hydroperoxide) | 1.000 |
| | 100.00 |
| PART TWO | |
| Baytec* MP020 | 100.00 |

*pre-reacted polymeric methylene diisocyanate having low free isocyanate content.

The composition as set forth in Table I, was applied to nuts and bolts in two equal amounts comprised of degreased steel and oily zinc phosphate fasteners (nuts and bolts). The initial breakloose torque was recorded and is shown in Table I. Breakloose-torque is the torque strength needed to unlocked threaded parts which were assembled together by applying anaerobic adhesives on fasteners followed by pretorquing with 40 inch-pounds force. Such a force generally results in all threaded surfaced being mated, and the breakloose-torque test is a useful test for threadlocking materials on assembled products. A relatively high breakloose torque is preferred as this is the force required to initially move the nut. A relatively lower prevail strength is desired to provide ease of disassembly. The results of these tests are shown in Table I.

TABLE II

| | Breakloose Torque Strength at 24 h/RT (in. lbs.) | |
|---|---|---|
| Substrate | Control* | Inventive Composition A |
| String | 62 | 128 |
| Clear tape | 33 | 141 |
| Teflon tape | 47 | 135 |
| Paper | 74 | 77 |
| Dry thin film | N/A | 124 |

*Substrate without coating.

As shown in Table II, the high breakloose values of the inventive compositions indicate that the composition has anaerobically cured subsequent to the mating of the parts. Inventive composition A was also tested on zinc phosphate coated steel nuts and bolts which were also coated with oil. For comparative purposes, the same type of nuts and bolts were tested without any adhesive product as well as with commercially available Threadlocker 2760. The results shown below indicate a breakloose which is significantly greater than nuts and bolts without any product, but lower than the standard liquid anaerobic product.

TABLE III

| Product Used | Type Test | Substrate | Nuts and Bolts | In.-Lbs. |
|---|---|---|---|---|
| None | Breakloose | None | Phos + Oil Steel | 41 |
| Inventive Composition A | Breakloose | None | Phos + Oil Steel | 237 |
| 2760 | Breakloose | None | Phos + Oil Steel | 451 |

The nut and bolt assemblies were also observed for any uncured material at the external bondlines and none were found to be present. The external bondlines were dry-to-the-touch.

Example II

Table IV below is another example of a two-part dry-to-the-touch composition capable of further anaerobic cure in accordance with the invention. The presence of PEGMA in the first part facilitates mixing and its physical presence serves to control the speed of reaction of the free isocyanate groups in the monomeric MDI.

TABLE IV

Inventive Composition B

| COMPONENT | % by weight | CAS No. |
|---|---|---|
| PART ONE | | |
| Monomeric 4,4'-MDI | 70-100 | 26447-40-5 |
| Polyethyleneglycol Dimethacrylate (PEGMA) | 0-30 | 110-82-7, 123-31-9 |
| PART TWO | | |
| Polyethyleneglycol Dimethacrylate | 1-30 | 110-82-7, 123-31-9 |
| Castor based organic thixotrope | 1-3 | 8001-78-3 |
| Castor oil | 20-40 | 8001-78-3 |
| 1,4 Butanediol | 5-15 | 110-63-4 |
| Poly (acrynonitrile-butadiene-styrene) | 5-20 | 100-42-5, 9003-56-9 |
| Saccharin | 1-2 | 81-07-2 |
| Polyethelene powder | 0.1-.5 | 9002-88-4 |
| Cumene hydroperoxide | 0.5-2.0 | 80-15-9 |
| Glycerine | 1-6 | 56-81-5 |
| Polyoxypropylenediamine | 5-10 | 9046-10-0 |

Parts One and Two of Composition 13 were mixed in a 1:2 ratio (Part One: Part Two). The resulting mixture was then applied as a thin film coating on a substrate and allowed to cure to room temperature for 24 hours to produce a dry-to-the-touch composition. The combination was also applied as a thin film coating to a polyethylene substrate and peeled from the polyethylene substrate to form a dry-to-the touch thin film after 24 hours of room temperature curing. Uncoated tape substrates and the tapes coated with the inventive compositions were applied to threaded bolts (zinc phosphate, oily steel ⅜×16). The bolts were then mated with nuts (zinc phosphate, oil steel ⅜×16) and allowed to cure 24 hours at room temperature. The results of the performance of the composition when placed on a variety of different substrate carriers are shown in Tables V and VI.

The initial breakloose-torque was recorded and is shown in Table V. Breakloose-torque is the torque strength needed to disassemble threaded parts which were assembled together by applying the compositions on fasteners followed by pre-torquing with 40 inch-pounds force. The initial breakaway-torque in inch-pounds was recorded and is shown in Table V. Breakaway-torque is the torque strength needed to unlock threaded parts which were hand assembled together without pretorque using an anaerobic adhesive.

TABLE V

| | Breakloose/Prevail Torque at 24 h(in. lbs.) | |
|---|---|---|
| Substrate | Control* | Inventive Composition A |
| Teflon tape | 47/25.4 | 135/36 |
| Cotton string | 39/11 | 128/42 |
| Clear tape | 33/8 | 141/20 |
| Paper strip | 43/15 | 275/32 |
| Dry thin film | N/A | 124/25 |

*Substrate without coating

TABLE VI

| | Breakaway/Prevail Torque at 24 h(in.-lbs.) | |
|---|---|---|
| Substrate | Control* | Inventive Composition A |
| Teflon tape | 0/0 | 95/36 |
| Cotton string | 35.4/17.4 | 28/39 |
| Paper strip | 38/19 | 139/201 |
| Dry thin film | N/A | 456/281 |

*Substrate without coating

As indicated in the results in Tables V and VI, the inventive compositions show significant improvement with respect to the difference between breakloose and prevail strengths where the breakloose strength was advantageously greater than the prevail strength, as compared to substrate tape alone.

The nut and bolt assemblies were also observed for any uncured material at the external bondlines and none were found to be present. The external bondlines were dry-to-the-touch.

Example III

Inventive Composition A was also formulated as a one-part system. In this embodiment, all components were mixed together at the time of use. In some embodiments of the one-part system, one or more highly reactive components such as diisocyanates, polyamines, polythiols or polyols may be encapsulated or otherwise physically or chemically treated to make them remain unreactive until needed. For example, protective groups may be chemically incorporated to tie-up the highly reactive moiety. Such groups may later be removed, such as by heat or other chemical means, when cure is desired. Other means of preventing their premature reaction may include physically separating them by coatings or other matrices which when ruptured release the component for reaction.

Inventive compositions C—F were made using the formulations as shown in the following Tables VII-X.

Example IV

Example IV was prepared according to the formulation set forth in Table VII below.

TABLE VII

Inventive Composition C

| COMPONENT | % by weight |
|---|---|
| PART ONE | |
| Lupranate MP 102* | 78.65 |
| Lupranate M20S* | 10.00 |
| Anaerobic catalyst (Saccharin) | 0.30 |
| Plasticizer (Triacetin) | 10.00 |
| Tertiary butyl peroxybenzoate (TBPB) | 1.00 |
| Defoaming agent | 0.05 |
| Total | 100.00 |
| PART TWO | |
| PEGMA | 25.00 |
| HPMA | 1.00 |
| Thickener | 0.50 |
| Tetrafunctional polyether polyol | 48.00 |
| Castor Oil (Low moisture polyol) | 24.39 |
| Dye | 0.04 |
| Defoaming agent | 0.05 |

TABLE VII-continued

| Inventive Composition C | |
|---|---|
| COMPONENT | % by weight |
| Dibutyltin dilaurate (DBTDL) | 0.02 |
| Anaerobic catalyst (Triethanolamine) | 1.00 |
| Total | 100.00 |

*Lupranate MP 102 and M20S are polymeric methylene diisocyanates of different viscocities.

Procedure for Preparing Composition C:

The first three components of Part One were added to a clean dry mixing vessel and mixed under a nitrogen blanket for approximately 15 minutes. The remaining components were added to the mixture. Once all the components were combined, the mixture was mixed for 30 minutes under antirogent blanket. A vacuum was applied to the mixture until it was deaerated.

The first six components of Part Two were added to a clean dry mixer and heated to approximately 65° C.-70° C. for about 1 hour under full vacuum. The mixture was then cooled to 45° C. The remaining components were added to the mixture and vacuumed for deaeration.

Example V

Example V was prepared according to the formulation set forth in Table VIII below.

TABLE VIII

| Inventive Composition D | |
|---|---|
| COMPONENT | % by weight |
| PART ONE | |
| Anaerobic catalyst (Saccharin) | 0.30 |
| Glycol triester plasticizer (Triacetin) | 10.00 |
| Lupranate MP 102 | 65.36 |
| Castor Oil (Low moisture polyol) | 8.28 |
| DBTDL | 0.01 |
| Lupranate M20S | 15.00 |
| TBPB | 1.00 |
| Defoaming agent | 0.05 |
| Total | 1.000 |
| PART TWO | |
| PEGMA | 25.00 |
| HPMA | 1.00 |
| Thickener | 1.50 |
| Polyol | 38.54 |
| Castor Oil (low moisture polyol) | 32.85 |
| Triethanolamine | 1.00 |
| Dye | 0.04 |
| Defoaming agent | 0.05 |
| DBTDL | 0.02 |
| Total | 100.00 |

Procedure for Preparing Composition D:

Part one components 1 and 2 were added to a clean, dry reactor which was flushed with nitrogen. Agitation was started and components 3-5 were added. The mixture was mixed for approximately 10-15 minutes. Heat was applied to the mixture and maintained at a temperature of approximately 55° C.-65° C. for about 1 hour under a nitrogen blanket. The mixture was checked for isocyanate content. Component 6 was then added while the mixture was cooling. Components 7 and 8 were added and the mixture was mixed for approximately 5 minutes. A vacuum was applied to the mixture until completely degassed. Part two components 1-7 were added to a clean, dry reactor and agitated for approximately 10-15 minutes. Heat was applied and maintained at a temperature of approximately 70° C.-75° C. for about 1 hour under full vacuum. Moisture content of the mixture was checked. The mixture was then cooled to approximately 40° C.-45° C. The remaining components, 8 and 9, were added to the mixture and mixed for approximately 5 minutes. A vacuum was applied to the mixture until completely degassed.

Example VI

Example VI was prepared according to the formulation set forth in Table IX below.

TABLE IX

| Inventive Composition E | |
|---|---|
| COMPONENTS | % by weight |
| PART ONE | |
| Triacetin | 13.00 |
| Lupranate MP 102 | 86.95 |
| Defoaming agent | 0.05 |
| Total | 100.00 |
| PART TWO | |
| PEGMA | 25.00 |
| Castor Oil (low moisture polyol) | 32.85 |
| Saccharin | 0.30 |
| Thickener | 1.00 |
| Triethanolamine | 1.50 |
| Polyol | 43.85 |
| Free-radical stabilizer | 0.75 |
| Chelator | 1.00 |
| Dye | 0.04 |
| Defoaming agent | 0.04 |
| DBTDL | 0.02 |
| TBPB | 0.05 |
| Total | 100.00 |

Procedure for Preparing Composition E:

Part one components 1-3 were added to a clean, dry reactor, which was flushed with nitrogen. The mixture was mixed for approximately 30 minutes under a nitrogen blanket. The completed mixture was discharged under nitrogen.

Part two components 1-4 were added to a clean, dry reactor and agitated for approximately 10-15 minutes. Components 5-9 were added to the mixture in their respective order. Heat was applied to the resulting mixture and maintained at a temperature of approximately 65° C.-70° C. for about 1 hour under full vacuum. The mixture was then cooled to approximately 45° C. The remaining components, 10-12, were added to the mixture and mixed for approximately 5 minutes. A vacuum was applied to the mixture until it was deaerated.

Example VII

Example VII was prepared according to the formulation set forth in Table IX below.

TABLE X

| Inventive Composition F | |
|---|---|
| COMPONENT | % by weight |
| PART ONE | |
| Lupranate MP 102 | 100.00 |
| Total | 100.00 |

TABLE X-continued

Inventive Composition F

| COMPONENT | % by weight |
|---|---|
| PART TWO | |
| PEGMA | 25.00 |
| Triacetin | 10.00 |
| Saccharin | 0.30 |
| Thickener | 1.00 |
| Castor Oil (low moisture polyol) | 12.50 |
| Triethanolamine | 1.50 |
| Polyol | 47.35 |
| Free-radical stabilizer | 0.75 |
| Chelator | 1.00 |
| Dye | 0.04 |
| Defoaming agent | 0.04 |
| TBPB | 0.50 |
| DBTDL | 0.02 |
| Total | 100.00 |

Procedure for Preparing Composition F:

Part two components 1-9 were added to a clean, dry reactor and heated to a temperature of approximately 65° C.-70° C. for about 1 hour under full vacuum. The mixture was then cooled to approximately 45° C. The remaining components, 10-13, were added to the mixture as it was mixing. A vacuum was applied to the mixture until degassed.

Example VII

Inventive compositions C and D were subjected to an evaluation subsequent to cure of the total composition to determine whether and to what extent the cured composition resisted exposure to various solvents under varying conditions.

In Tables XI and XII below, inventive composition C and D were spread onto aluminum substrates and cured, at room temperature for about seven days, into films having a thickness of about 20 mil to about 60 mil. The films were cut into one inch squares. After seven days, the assemblies were exposed to the conditions specified in the tables below. After that exposure the respective solvents were evaluated for residual materials. As indicated, the amount of residual material was less than 10 gm/in$^2$ regardless of the solvent and temperature used. The total amount of residual material, as shown in Table XI, was then dissolved in hot chloroform and filtered. The results from this test, after evaporation of the chloroform, was further evaluated for residual material, as shown in Table XII. The results shown in both Tables XI and XII indicate that very little uncured or unreacted material remains and thus the potential for migration or contamination of surrounding items is negligible.

TABLE XI

Solvent Resistance Test I

| | | Total Residual Material, mg/in$^2$ | | |
|---|---|---|---|---|
| Sample No. | Inventive Composition | Water, 30 min. @ 212° F. | Heptane, 2 hr @ 150° F. | 8% Ethanol, 2 hr @ 150° F. |
| 1 | C | 2.36 | 0.076* | 4.54 |
| 2 | C | 4.36 | 0.096* | 5.74 |
| 3 | C | 4.12 | 0.076* | 5.26 |
| 4 | D | 6.02 | 0.260* | 6.30 |
| 5 | D | 5.44 | 0.344* | 9.38 |
| 6 | D | 5.78 | 0.304* | 6.92 |

TABLE XII

Solvent Resistance Test II

| | | Total Residual Material, mg/in$^2$ | | |
|---|---|---|---|---|
| Sample No. | Inventive Composition | Water, 30 min. @ 212° F. | Heptane, 2 hr @ 150° F. | 8% Ethanol, 2 hr @ 150° F. |
| 1 | C | 0.180 | 0.064* | 2.00 |
| 2 | C | 1.88 | 0.052* | 3.20 |
| 3 | C | 2.42 | 0.088* | 1.98 |
| 4 | D | 2.14 | 0.184* | 0.52 |
| 5 | D | 1.50 | 0.240* | 2.24 |
| 6 | D | 3.28 | 0.228* | 1.66 |

Example IX

Compositions C and D were also tested for their threadlocking strength on non-ferrous (passive) substrates, as compared to commercially available LOCTITE 242 threadlocker. The results, shown below in Table XIII, indicate significantly greater breakaway and prevail values than the commercial liquid threadlocker. This demonstrates excellent strength on substrates in which conventional anaerobics have difficulty achieving high strength curves. Thus, the substrate insensitivity of the inventive compositions is clearly shown in these tests.

TABLE XIII

| | Threadlocker Adhesives | | |
|---|---|---|---|
| Properties | Control | Inventive Composition C | Inventive Composition D |
| Breakaway strength/prevail, in-lbs Stainless Steel | N/A | 206/67 | 137/53 |
| Breakloose strength/prevail, in-lbs Stainless Steel | 43/2 | 243/64 | 163/69 |
| Breakaway strength/prevail, in-lbs Regular Steel | N/A | 168/88 | N/A |
| Breakloose strength/prevail, in-lbs Regular Steel | 129/22 | 249/64 | 179/50 |
| Breakaway strength/prevail, in-lbs Zinc Phosphate | 93/20 | 198/67 | N/A |
| Breakloose strength/prevail, in-lbs Zinc Phosphate | 120/19 | 210/56 | 154/42 |

The invention claimed is:

1. A two part anaerobically curable composition, whose curable composition of a first part and a second part consists essentially of:
   (a) a first part comprising:
      (i) curable composition comprising:
         (1) a diisocyanate and
         (2) optionally at least one material selected from the group consisting of a polyol, a polyamine, and a polythiol; and
   (b) a second part comprising:
      (i) a curable composition comprising:
         (1) an anaerobically curable material comprising a (meth)acrylate component;
         (2) an anaerobic cure system; and
         (3) at least one material selected from the group consisting of a polyol, polyamine, and a polythiol, wherein when mixed together an anaerobically curable composition is formed and a polymeric matrix is formed from the diisocyanate of the first part and the at least one material selected from the group consisting of a polyol, polyamine, and a polythiol of the second part and optionally of the first part through which is distributed the anaerobically curable composition.

2. The composition of claim 1, wherein the anaerobic cure system comprises a peroxide.

3. The composition of claim 1, wherein the composition is non-flowable prior to anaerobic cure at temperatures of greater than 260° C. up to about 300° C.

4. The composition of claim 1, wherein the diisocyanate is a polymeric diisocyanate.

5. The composition of claim 1, wherein the first part is present in amounts of about 30% to about 80% by weight percent of the total composition.

6. A two part anaerobically curable composition comprising:
   (a) a first part comprising the cured reaction product of a diisocyanate and one or more of;
      (i) a polyol;
      (ii) a polyamine and
      (iii) a polythiol; and
   (b) a second part comprising (meth)acrylate component and an anaerobic cure system,
wherein the first part comprises about 30% to about 80% by weight of the total composition and the composition is non-flowable at temperatures greater than 260° C. up to about 300° C.

7. A two part anaerobically curable composition comprising:
   (a) a first part comprising:
      (i) a diisocyanate; and
   (b) a second part comprising:
      (i) a (meth)acrylate component; and
      (ii) at least one of the following:
         (1) a polyol;
         (2) a polyamine; and
         (3) a polythiol;
wherein the composition is non-flowable at temperatures greater than 260° C. up to about 300° C.

8. An article of manufacture comprising:
   (a) a threaded member, wherein the threads of said threaded member are at least partially coated with the composition of claim 1.

9. An article of manufacture comprising a preformed gasket comprising the composition of claim 1.

10. An article of manufacture comprising:
   (a) a dispenser containing the composition of claim 1.

11. The article of manufacture of claim 10, wherein the dispenser comprises separate chambers for the first part and the second part and one or more plungers to advance the contents of the separate chambers.

12. The article of manufacture of claim 11, wherein the dispenser includes a static mixing nozzle for mixing the first and second parts.

13. A method of sealing threaded parts comprising:
   (a) providing a first threaded member;
   (b) providing a second threaded member capable of matingly engaging with said first threaded member;
   at least one of said first and second members being at least partially coated with a composition comprising: a first part comprising a curable composition comprising: a diisocyanate and optionally a polyol, a polyamine and a polythiol; and
   a second part comprising a curable composition comprising: an anaerobically curable material comprising a (meth)acrylate component; an anaerobic cure system; and at least one material selected from the group consisting of a polyol, a polyamine and a polythiol; and
   (c) matingly engaging said first and second threaded members and permitting the composition to anaerobically cure therebetween.

14. A composition comprising:
   (a) a first part comprising:
      (i) curable composition comprising:
         (1) a diisocyanate and
         (2) optionally a polyol and a polyamine; and
   (b) a second part comprising:
      (i) a curable composition comprising:
         (1) an anaerobically curable material comprising a (meth)acrylate component;
         (2) an anaerobic cure system; and
         (3) a polyol and a polyamine.

* * * * *